(12) United States Patent
Grönland et al.

(10) Patent No.: US 8,684,034 B2
(45) Date of Patent: Apr. 1, 2014

(54) PRESSURE RELIEF VALVE

(75) Inventors: Tor-Arne Grönland, Sollentuna (SE); Pelle Rangsten, Storvreta (SE); Kerstin Jonsson, Uppsala (SE); Johan Bejhed, Uppsala (SE)

(73) Assignee: Nanospace AB, Uppsala (SE)

( * ) Notice: Subject to any disclaimer, the term of this patent is extended or adjusted under 35 U.S.C. 154(b) by 283 days.

(21) Appl. No.: 13/125,453

(22) PCT Filed: Oct. 19, 2009

(86) PCT No.: PCT/SE2009/051181
§ 371 (c)(1),
(2), (4) Date: Apr. 21, 2011

(87) PCT Pub. No.: WO2010/047648
PCT Pub. Date: Apr. 29, 2010

(65) Prior Publication Data
US 2011/0204266 A1  Aug. 25, 2011

(30) Foreign Application Priority Data
Oct. 22, 2008  (SE) .......................... 0850049

(51) Int. Cl.
*F16K 31/12*   (2006.01)
(52) U.S. Cl.
USPC ..................... 137/601.14; 137/74; 137/512.3; 137/550; 137/601.2

(58) Field of Classification Search
USPC .......... 137/68.19, 68.23, 74, 512, 512.3, 550, 137/910, 494, 496, 508, 599.14, 601.13, 137/601.14, 601.2
See application file for complete search history.

(56) References Cited

U.S. PATENT DOCUMENTS

| 4,352,365 | A | * | 10/1982 | Boccardo et al. | .......... 137/68.23 |
| 6,378,544 | B1 | * | 4/2002 | DiBello | ..................... 137/68.25 |
| 6,664,126 | B1 | | 12/2003 | Devoe et al. | |
| 6,976,500 | B2 | | 12/2005 | Lorenz-Bornert | |
| 8,141,572 | B2 | * | 3/2012 | Stenmark et al. | .......... 137/15.19 |
| 2005/0158188 | A1 | | 7/2005 | Matsui et al. | |
| 2006/0076068 | A1 | * | 4/2006 | Young et al. | .................. 137/829 |

FOREIGN PATENT DOCUMENTS

| EP | 1640664 A2 | 3/2006 |
| WO | WO 01/94823 A1 | 12/2001 |
| WO | WO 2006/012510 A1 | 2/2006 |
| WO | WO 2007/040455 A1 | 4/2007 |
| WO | WO 2007/078250 A1 | 7/2007 |

* cited by examiner

Primary Examiner — John Rivell
(74) Attorney, Agent, or Firm — Birch, Stewart, Kolasch & Birch, LLP

(57) ABSTRACT

A micromechanical pressure relief valve arrangement comprises a stack of wafers. An active pressure relief valve is realized within the stack of wafers. A passive pressure relief valve is also realized within the stack of wafers, arranged in parallel to the active pressure relief valve. A check valve, also realized within the stack of wafers, is arranged in series with both the active pressure relief valve and the passive pressure relief valve.

11 Claims, 4 Drawing Sheets

PRESSURE RELIEF VALVE

TECHNICAL FIELD

The present invention relates in general to valve arrangements and in particular safety valve arrangements.

BACKGROUND

In many different applications, gas from a gas storage, typically under high pressure, is successively used for a particular purpose at an end equipment. The purpose can e.g. be a chemical reaction, for combustion or for use as a transport medium. A more specific application can be found in space technology, where the mass of streaming gas is utilized in a gas thruster for propelling e.g. a space vehicle.

In arrangements of this kind, it is often vital that the final application is not exposed for gas of a too high pressure. Typically, a pressure regulator is provided at the exit of the gas storage to insure that the pressure at the end equipment is sufficiently low. However, if such a pressure regulator fails, gas of a high pressure may be released and the end equipment may thus be damaged. Also other equipment situated in the vicinity of the end equipment may be damaged as well. In cases the end equipment is difficult to repair or exchange, e.g. due to hazardous environments or simply being sent away on a space mission, such failure may cost huge amount of money.

These problems can be met by connecting different kinds of monitoring and/or safety valve devices to the supply line between the pressure regulator of the gas storage and the end equipment. If the pressure in the supply line becomes too high, gas is allowed to escape from the supply line in a manner not harming the end equipment. Different types of arrangements have different advantages and disadvantages. For instance, a passive safety valve is often relatively simple, however, it is often difficult to define a very exact release pressure. An active safety valve on the other hand, being operated in dependence e.g. on a monitored gas pressure can be provided with "intelligence" for not opening unnecessarily. However, such equipment relies on the error-free operation of the gas pressure monitor. Furthermore, pure safety valves are not suitable for handling temporary failures, since they typically are not re-sealable.

A common problem with all kinds of prior art safety valve arrangements is that they typically introduce new equipment which can fail as such, and which increases the complexity of connections. An arrangement of the type described above is typically requested to be extremely well sealed off when not being in use. Each connection of a new piece of equipment to a supply line increases the risks for leaks to be introduced in the system. Furthermore, each additional component typically also adds to the weight and volume, which can be a great disadvantage, at least for space applications.

SUMMARY

A general object of the present invention is to provide a pressure relief valve with a very high degree of reliability. A further object of the present invention is to provide a pressure relief valve that has low mass and has a low volume.

The above objects are achieved by a micromechanical pressure relief valve arrangement according to the enclosed patent claims. In general words, a micromechanical pressure relief valve arrangement comprises a stack of wafers. An active pressure relief valve is realized within the stack of wafers. A passive pressure relief valve is also realized within said stack of wafers, arranged in parallel to the active pressure relief valve. A check valve, also realized within the stack of wafers, is arranged in series with both the active pressure relief valve and the passive pressure relief valve.

One advantage with the present invention is that a very high degree of reliability is achieved by one single unit of low weight and volume. Further advantages are described in connection with different embodiments in the detailed description further below.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

Figure 1A:
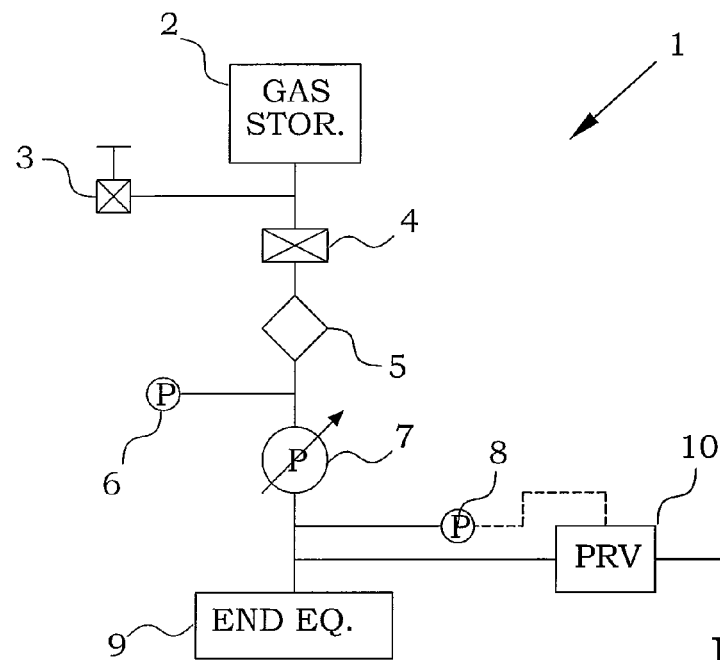
FIG. 1A is a block scheme of an embodiment of a gas system in which a pressure relief valve arrangement 10 advantageously is used.

FIG. 1A schematically illustrates an embodiment of a typical gas system 1 in which a pressure relief valve 10 advantageously is applied. Gas is stored in a gas storage 2 under high pressure. The gas storage is filled via a fill and vent valve 3, which after filling is accurately sealed. The gas storage 2 is also fluidly connected to an isolation valve 4, which is sealed during the filling procedure. The isolation valve 4 can be opened when the system is to be operated. Typically, the isolation valve 4 is of a one-shot type, which cannot be closed again. When opening such a isolation valve, debris may be produced and a filter 5 is provided downstream the isolation valve 4 in order to stop debris to reach further downstream in the system. A reduction valve 7 is fluidly connected between the filter and an end equipment 9, for reducing the high pressure as provided from the gas storage 2 into a pressure suitable for the end equipment 9. A high-pressure monitor 6 may be connected to the system upstream of the reduction valve 7 in order to keep track on the remaining gas amount in the gas storage 2. Preferably, a pressure meter 8 is also connected at the downstream side of the reduction valve 7 in order to keep track of the pressure of the gas provided to the end equipment 9. For safety reasons, a pressure relief valve arrangement 10 is provided in fluid contact with a supply line between the reduction valve 7 and the end equipment 9. Preferably, such pressure relief valve arrangement 10 is configured as will be described more in detail below.

In order to provide a highly reliable pressure relief valve, a number of requisites have been identified in the present invention. First of all, the pressure relief valve arrangement should operate as a highly reliable isolation valve when not yet actuated. This is important for prohibiting gas to successively leak out from the system during non-operation periods, which otherwise would reduce the life-time of the gas storage.

Another requisite is to include the functionality of an active relief valve, preferably dependent on a pressure monitoring. Such an active relief valve can then act as a first stage safety valve. Yet another requisite is to include the functionality of a passive relief valve. This functionality will be a second stage safety valve, e.g. if the pressure monitoring fails or if the system is exposed to a power failure. Preferably, the devices for the actual actuation of the active and passive relief valves are provided with a redundancy, to cover up for mechanical failures in the actual valves. Finally, it is also requested to provide a check valve functionality. In the case of a temporary failure of the reduction valve 7 or if the high pressure was caused by e.g. a temporary high temperature, it would be beneficial to still be able to use remaining parts of the gas in the gas storage. Since such a valve typically is situated after the active and passive relief valves, which may produce debris when actuated, a filter is preferably provided upstream the check valve.

Figure 1B:
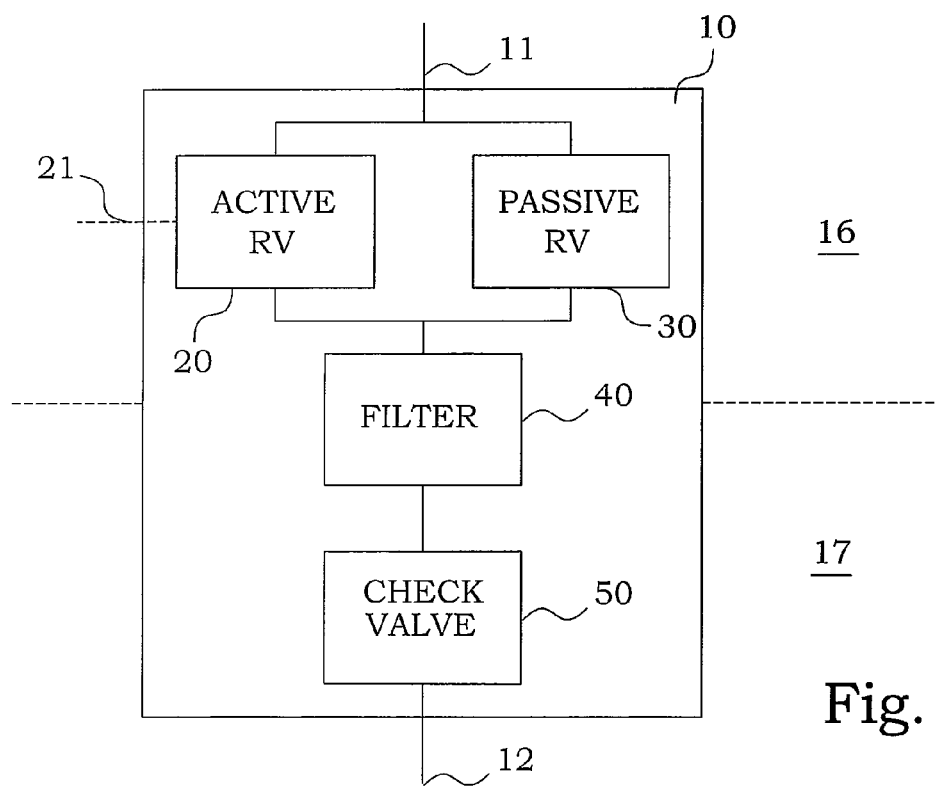
FIG. 1B is a block scheme of an embodiment of a pressure relief valve arrangement 10 according to the present invention.

In FIG. 1B, a block diagram of an embodiment of a pressure relief valve arrangement 10 according to the present invention is illustrated. One or several entrances 11 connect a high pressure side 16 of the surroundings of the pressure relief valve arrangement 10 with an active relief valve 20 and a passive relief valve 30. The active relief valve 20 and the passive relief valve 30 are in other words provided in parallel. The outputs from the active relief valve 20 and the passive relief valve 30 are connected to a filter 40 in which any debris are trapped. A check valve 50 is then connected to the output of the filter 40. The check valve is thus provided in series with both the active relief valve 20 and the passive relief valve 30. The output of the check valve 50 constitutes the exit 12 from the pressure relief valve arrangement 10, out to a low pressure side 17 of the surroundings. The notations "high pressure side" and "low pressure side" are in the present disclosure only relating to the relationship between the pressures at the different sides and do not imply any properties of the absolute pressure at each side. The "high pressure side" may therefore be exposed to a pressure even below atmospheric pressure as long as the "low pressure side" is exposed to even lower pressure. Similarly, the "low pressure side" may be exposed to a pressure far above atmospheric pressure as long as the "high pressure side" is exposed to even higher pressure.

It is preferred if the different functionalities cooperate in a certain manner. An active relief valve 20 is typically actuated if the pressure exceeds a threshold pressure, or if the pressure exceeds a threshold pressure for a certain time. A passive relief valve typically also opens at a certain threshold pressure. It is preferred if the threshold pressure of the passive relief valve 30 is higher than the threshold pressure of the active relief valve 20, typically also with a reasonable margin. Also for the check valve 50, there is a threshold pressure above which the check valve 50 should open and let the gas flow out. It is preferred if this threshold is lower than the thresholds for the active relief valve 20 and the passive relief valve 30. This is not an absolute demand, but it is preferred to ensure that upon opening of either of the active relief valve 20 and the passive relief valve 30, the check valve 50 should also open in order to let some of the gas blow through the entire escape path to ensure that it is free from obstacles. However, it is also possible to use a check valve with a opening pressure that is higher than one or both of the threshold pressures for the active relief valve 20 and the passive relief valve 30.

It would also be possible in an alternative embodiment to place the check valve 50 in series with the active relief valve 20 and the passive relief valve 30, but at the upstream side. In such a case, the check valve should operate on a pressure difference between the high pressure side and the low pressure side of the entire pressure relief valve arrangement 10. Before the active relief valve 20 or the passive relief valve 30 is activated, the check valve may indeed open, but in such cases, the gas will only be allowed to flow to the closed active relief valve 20 or the passive relief valve 30. Such an arrangement may also operate without any filter, if debris from the active relief valve 20 or the passive relief valve 30 can be allowed to exit the pressure relief valve arrangement 10.

Figure 2:
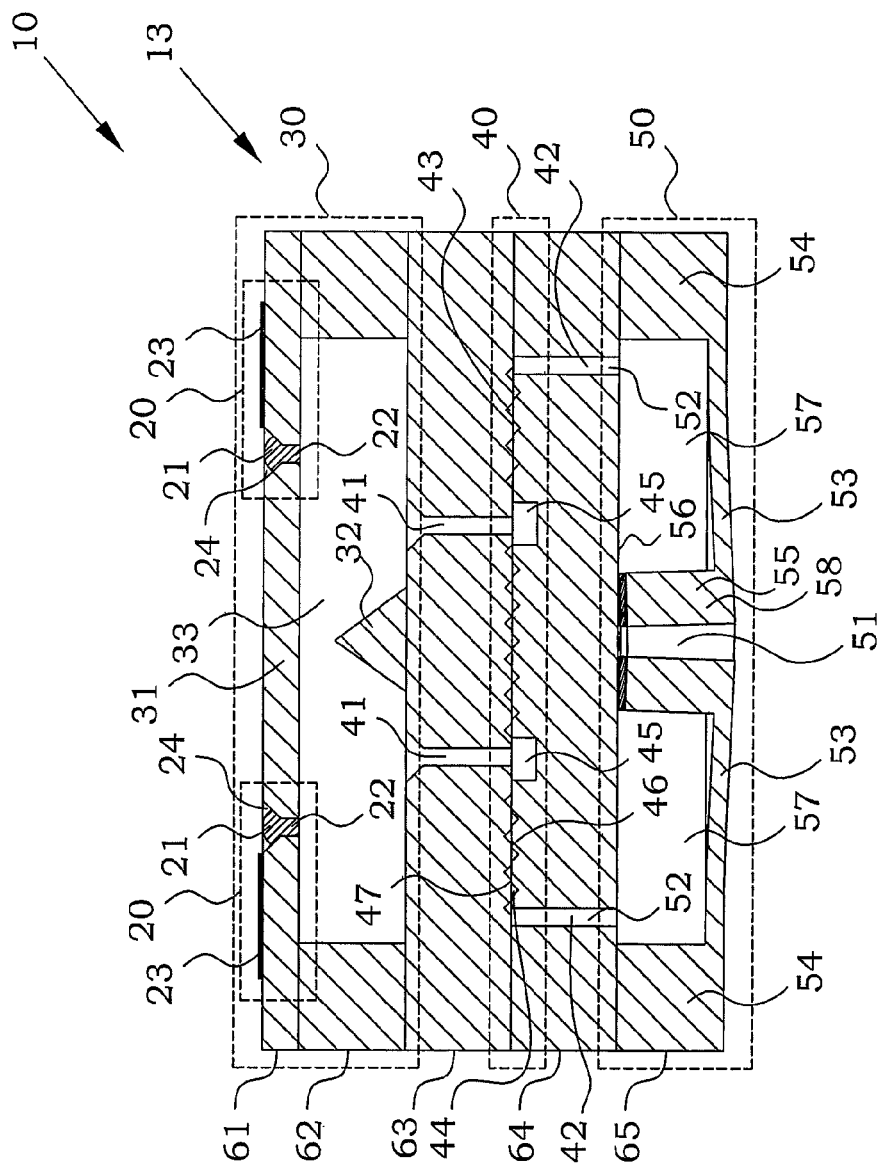
FIG. 2 is a cross-sectional view of an embodiment of a micromechanical pressure relief valve arrangement 10 according to the present invention.

In the schematic illustrations above, several functionalities are requested. In order to reduce the risks for leaks and to facilitate the mechanical mounting, it is preferred to provide all functionalities within one single unit. Furthermore, in order to save weight and volume, the selection of the present invention is to use micromechanics. FIG. 2 is a cross-sectional view of one embodiment of a micromechanical pressure relief valve arrangement 10 according to the present invention. The pressure relief valve arrangement 10 comprises a stack of wafers 13. In this embodiment, a five-wafer stack is utilized, comprising the wafers 61-65.

Two active relief valves 20 are realized in a first wafer 61. The active relief valves 20 are identical and simply provide a redundancy in this function. Each active relief valve 20 comprises a hole 22 through the first wafer 61. At the high pressure side 16, the hole 22 is widening into a frustum of a cone 24. A solder material 21 is sealing the hole 22. The solder material 21 is further supported by the frustum of the cone 24 when a pressure is applied on the high-pressure side. If the expected pressure difference between the high and low pressure sides 16, 17 is relatively large, the hole 22 has typically to be very small, in order for the solder material to withstand the pressure difference. A hole size of less than 300 82 m may be suitable for a pressure difference of 13 Bar (1.3 MPa). An electrical conductor 23 is provided at the surface of the first wafer 61. The electrical conductor 23 is arranged to provide resistance heating in an area in the vicinity of the hole 22. By sending a current through the electrical conductor 23, the area in the vicinity of the hole 22 is heated and eventually, the solder material 21 is melted. In a melted form, the solder material 21 cannot any longer withstand the pressure difference between the high and low pressure sides 16, 17 and the melted solder material will be blown into a volume 33 behind the hole 22. The gas at the high pressure side 16 can evacuate through the opened hole 22. These active relief valves 20 are thus resistive heat actuated valves. This kind of valve is, as such, known in prior art and has proven to be extremely reliable. However, also active relief valves 20 of other types realized in a stack of wafers may be useful in the present invention.

A passive relief valve 30 is in the present embodiment realized by a combination of the first wafer 61 and the second wafer 62. The first wafer 61 is relatively thin. The second wafer 62 presents an empty volume 33. The area of the first wafer 61 that covers the empty volume 33 constitutes a large area membrane 31. When a pressure difference is applied over the two wafers 61, 62, the large area membrane 31 bends into the empty volume 33. At a certain pressure difference, the bending of the large area membrane 31 becomes so large that the large area membrane 31 cracks, and the passive relief valve 30 is opened. The cracking pressure depends on the area size and shape of the large area membrane 31, the thickness of the first wafer 61 and the occurrence of crack initiators in the large area membrane 31. The uncertainty is generally relatively large and in order to make the cracking pressure more predictable, a crack initiator 32 is provided in the middle of the empty volume 33. When the bending of the large area membrane 31 reaches the tip of the crack initiator 32, a force is applied locally on the large area membrane 31, which induces a cracking process. Such a process is easier to predict.

A filter 40 is realized by the interface between the third wafer 63 and the fourth wafer 64. Two filter inlets 41 allow the gas that is present in the volume 33 to pass the third wafer 63 and enter into a respective entrance volume 45. Patterns of grooves 43 are provided in a surface 46 of the third wafer 63 facing the fourth wafer 64. Similarly, patterns of grooves 44 are provided in a surface 47 of the fourth wafer 64 facing the third wafer 63. The patterns of grooves 43, 44 are arranged in a crossing fashion. This leads to that gas is allowed to flow first through the grooves 44 of the fourth wafer 64, then crossing over to grooves 43 of the third wafer 63 and finally into a number of filter outlets 42. The grooves 43, 44 are small, but since they are provided in a very large number, the total gas flow that is allowed to pass the filter 40 becomes reasonably large. The small size of the finest grooves, typically in the order of 1 μm, prohibits any solid particles larger than that to pass the filter. Any debris from a ruptured active relief valve 20 or passive relief valve 30 is thereby stopped. Due to the large number of grooves 43, 44, there will always be flow paths open, even if some grooves 43, 44 are plugged with solid particles. The filter outlets 42 bring the filtered gas through the fourth wafer 64. Different kinds of detailed filter configurations can be found e.g. in the international patent application publication WO 2007/078250.

The check valve 50 is realized by the fifth wafer 65 using the fourth wafer 64 as a valve seat. The fifth wafer 65 comprises a membrane 53, edge walls 54 and centre walls 55. The membrane 53, edge walls 54 and centre walls 55 enclose, together with a surface 56 of the fourth wafer 64, a volume 57. A check valve inlet 52, being in fluid contact with the filter outlet 42, brings any gas into the volume 57. The edge walls 54 are clamped or bonded to the fourth wafer 64, while the centre walls 55 in a non-pressurized condition rest against the surface 56, thereby acting as a valve body 58. The valve body 58 is provided with a coating as a valve seat 59 at the valve body surface supporting against the surface 56. The additional thickness added by the coating will cause the membrane 53 to bend slightly outwards, thereby providing a mechanically biased valve body 58. The check valve 50 is thereby a check valve utilizing a biased valve body 58 of the fifth wafer 65 supporting against a surface 56 of a neighbouring wafer; the fourth wafer 64. When gas of a pressure higher than the low pressure side 17 pressure enters the volume 57, the force will act on the membrane 53 for trying to remove the valve seat 59 from the surface 56. At a certain cracking pressure, the force will be large enough to remove the contact between the valve seat 59 from the surface 56, at least to such an amount that gas can escape between them and leave the check valve 50 through an exit 51. The bias of the valve seat 59 against the surface 56 is dependent on the area, shape and thickness of the membrane as well as the thickness of the valve seat 59. A test equipment having a circular membrane of 3.0 mm outer diameter, 1.5 mm inner diameter and 65 μm thickness and a valve seat thickness of 2.8 μm, has an approximate opening pressure of 600-700 kPa. The valve seat 59 can e.g. be manufactured by evaporation or sputtering of relatively soft metals. An evaporated metal stack of Ti/Cu/Ni/Au, produced by use of a shadow mask, has been tested with good results. However, it is believed that sputtered layers of Al or Ni might be easier to control regarding e.g. coating thicknesses. Check valves based on this technology have been shown to exhibit a very excellent low leak rate during low pressure difference conditions. Note that the thickness of the valve seat 59 in the figure is exaggerated in order to illustrate the biasing concept.

In an alternative embodiment, the valve seat coating could instead be provided at the surface of the fourth wafer, against which the valve body is supported.

The embodiment of FIG. 2 has the advantage that the entire gas path from the entrances of the active relief valves 20 or the passive relief valve 30 entirely is comprised in the stack of wafers 13. The manufacturing techniques for such wafer stack are well developed and the risk for leaks is very small. By letting the active relief valves 20 and the passive relief valve 30 have the same intended volume into which the valve should burst, the connections and filtering can be made very simple. Such a configuration is typically achieved by arranging the active pressure relief valves 20 and the passive pressure relief valve 30 in parallel in a first wafer 63 of the stack of wafers 13.

Figure 3:
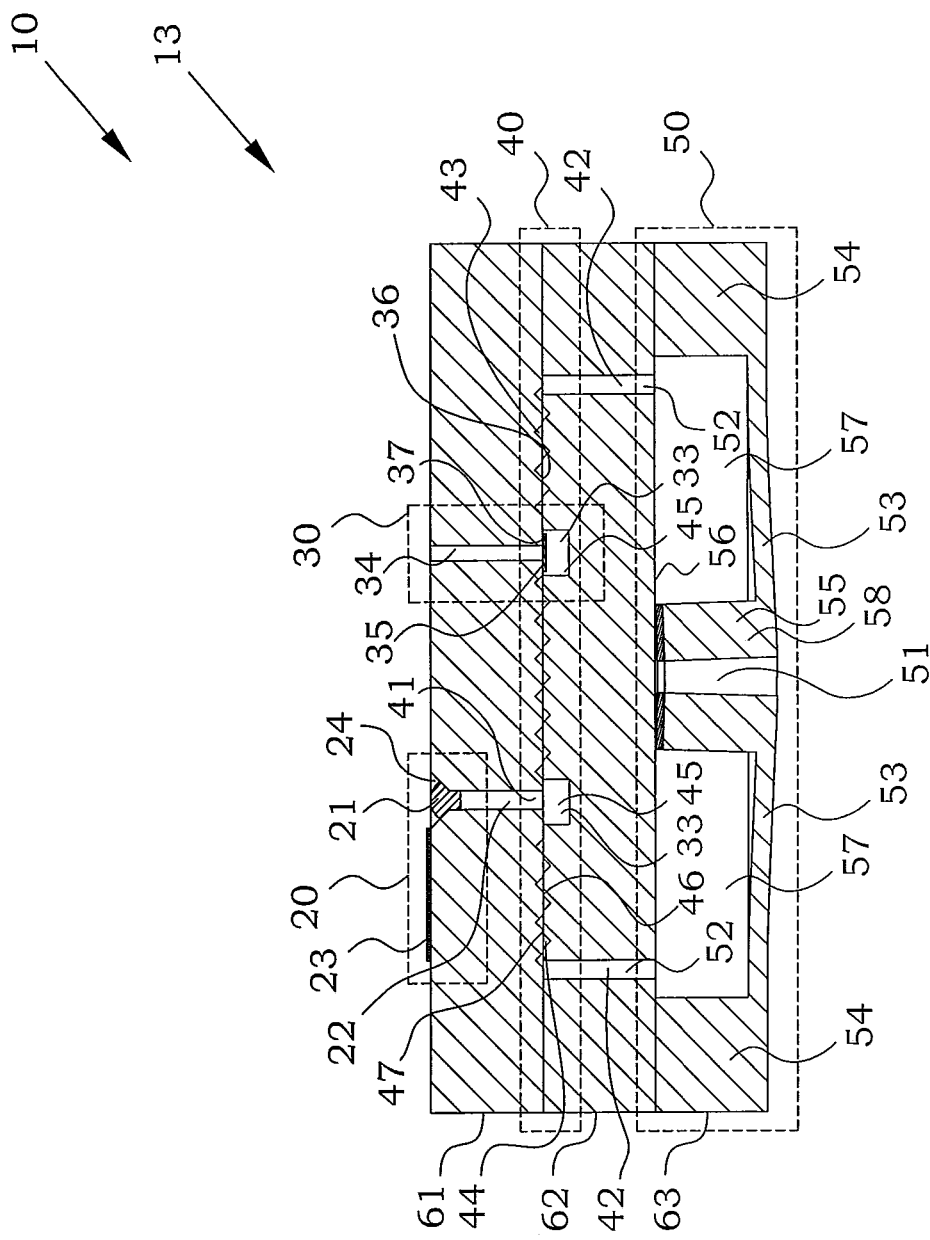
FIG. 3 is a cross-sectional view of another embodiment of a micromechanical pressure relief valve arrangement 10 according to the present invention.

FIG. 3 illustrates another, presently preferred, embodiment of a micromechanical pressure relief valve arrangement 10 according to the present invention. The pressure relief valve arrangement 10 comprises also here a stack of wafers 13. In this embodiment, a three-wafer stack is utilized, comprising the wafers 61-63. The active relief valve 20 comprises as in the previous embodiment a resistive heat actuated valve, and will not be further discussed.

The passive relief valve 30 is in this embodiment a small area membrane relief valve based on a single crystalline silicon-on-insulator (SOI) membrane 35. A hole 34 with a well defined diameter is provided through the first wafer 61. In the present embodiment, a hole diameter 200 μm has been used. The first wafer 61 is in this embodiment a silicon wafer with the surface 36 facing the second wafer 62 oxidized. In other words, a silicon oxide 37 is formed at the surface 36, with a typical thickness of 0.1-1.0 μm. The single crystalline SOI membrane 35 of a very well controllable thickness, typically in the range of 1-100 μm, is thus provided onto the silicon oxide 37. The hole is typically defined by lithography and produced by etching after the provision of the silicon oxide 37 and the single crystalline SOI membrane 35. The silicon oxide 37 layer can be very well-defined in thickness and is therefore useful as an etch stop layer, which then can be selectively removed. Left over the hole 34 is the single crystalline SOI membrane 35. The passive relief valve 30 in this embodiment thus comprises a relief membrane 35 composed by a mono-crystalline silicon device layer. A square single crystalline SOI membrane 35 with an edge of 470 μm and a nominal thickness of 10 μm showed to have a burst pressure difference of 11.8±0.7 Bar (1.18±0.07 MPa). Due to the well controlled crystallinity and thickness, the burst pressure difference can be quite well predicted. Furthermore, the crystalline growth also ensures a leak tight bond to the silicon oxide. In the present embodiment, two passive relief valves 30 are provided through the first wafer 61, for redundancy purposes.

In alternative embodiments, also other types of small area membrane relief valves can be utilized. A hole in the first wafer could for instance be etched down to the silicon oxide layer, leaving this silicon oxide layer as a burst membrane. In such a case, the oxide layer is typically in the range of above 1 μm. A hole could also be etched from the opposite side, leaving only a thin layer of silicon at the top of the wafer, also in the range of 1-100 μm.

In the present embodiment of FIG. 3, both active relief valves 20 as well as both passive relief valves 30 exit into the volume 33, which in this embodiment is ring shaped. In other words, the openings of all relief valves are provided to the same volume. The volume 33 is comprised in the second wafer 62. In this embodiment, the filter 40 is realized by use of the interface between the first wafer 61 and the second wafer 62, i.e. the filter arrangement is realized by an interface involving a wafer 61 in which the active pressure relief valves 20 and the passive pressure relief valves 30 are arranged. The basic principles of the filter 40 are the same as was described in the embodiment of FIG. 2 and are not further discussed.

The check valve 50 is operating along the same principles as in the embodiment of FIG. 2, however, now realized with the third wafer 63. The operation is the same and will not be further discussed.

In alternative embodiments, spring suspended check valves may also be used together with the present invention. However, the biased membrane check valve has the advantage of being more robust, since even malfunction of a single spring will cause a malfunction of a spring suspended check valve. Furthermore, the biased membrane solution is less sensitive to particles and is easier to dimension e.g. for a predetermined opening pressure.

An advantage of the embodiment of FIG. 3 is that all parts are easily provided at the different wafers in a configuration that is independent on the relative rotation between the different wafers in the stack. In such a way, troublesome alignment procedures during the manufacturing may be avoided, since the functionality is insensitive to rotational misalignments. Furthermore, by only having to make use of three different wafers, the manufacturing and assembling is facilitated.

Figure 4:
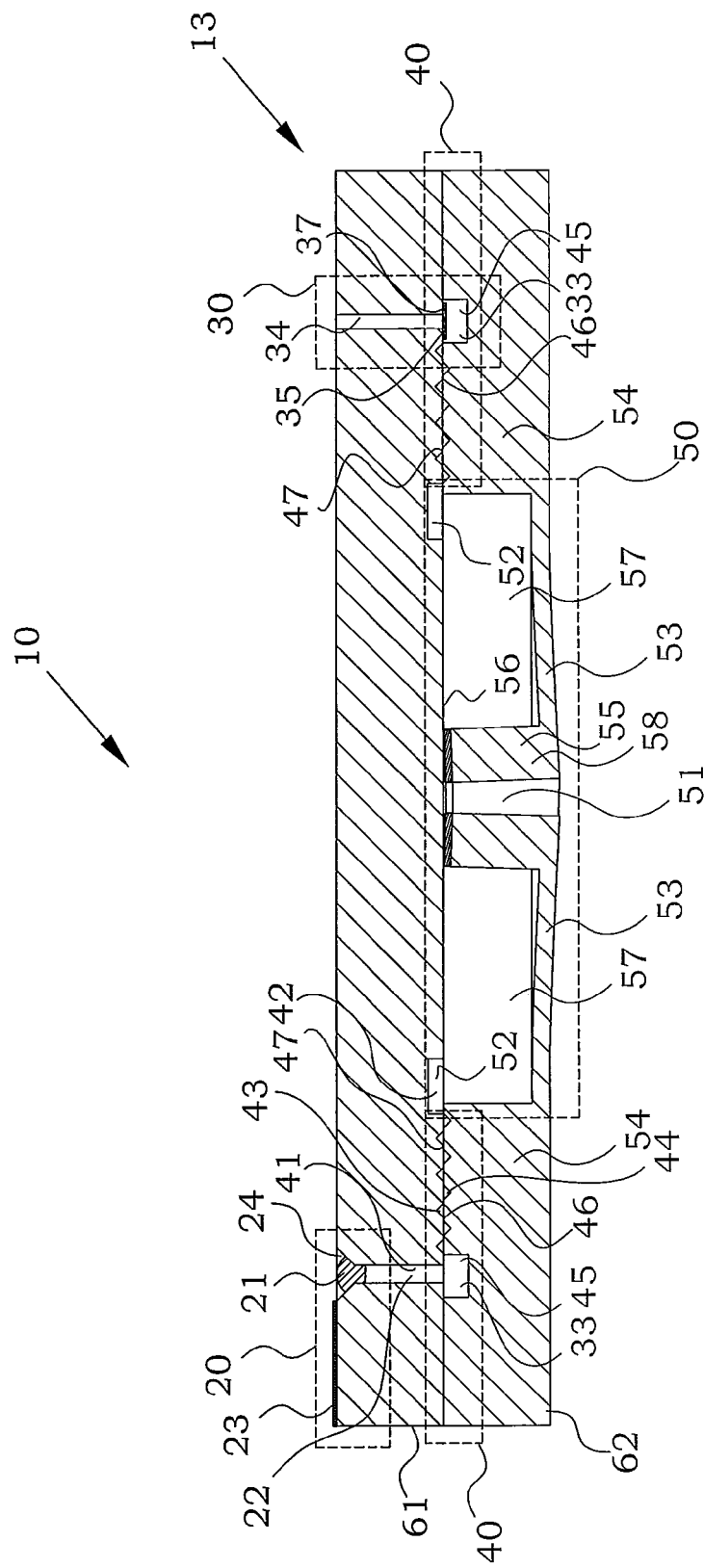
FIG. 4 is a cross-sectional view of yet another embodiment of a micromechanical pressure relief valve arrangement 10 according to the present invention.

FIG. 4 illustrates another embodiment of a micromechanical pressure relief valve arrangement 10 according to the present invention. In this embodiment, the same basic features as in FIG. 3 are present, however, realized by only two wafers. A result of this further reduction of the number of wafers is, however, that different components of the pressure relief valve arrangement 10 have to be provided in a radial relationship. The check valve 50 is in this embodiment provided in the centre whereas the active relief valves 20 and passive relief valves 30 are provided at the outer parts of the wafer stack. This put restrictions in e.g. the filter throughput for a certain largest radius of the wafer stack. Furthermore, the manufacturing of the two remaining wafers also becomes more complex. Presently, the three wafer stack solution is believed to be the most cost efficient one, considering manufacturing costs.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A micromechanical pressure relief valve arrangement, comprising:
   a stack of wafers;
   an active pressure relief valve realized within said stack of wafers;
   a passive pressure relief valve, realized within said stack of wafers, arranged in parallel to said active pressure relief valve;
   a check valve, realized within said stack of wafers, arranged in series with both said active pressure relief valve and said passive pressure relief valve so that upon opening said check valve and either one of said active pressure relief valve and said passive pressure relief valve, an entire escape path through said micromechanical pressure relief valve arrangement is created.

2. The micromechanical pressure relief valve arrangement according to claim 1, wherein said check valve is provided in a different wafer than and downstream of both said active pressure relief valve and said passive pressure relief valve.

3. The micromechanical pressure relief valve arrangement according to claim 1, wherein said active pressure relief valve and said passive pressure relief valve are arranged in parallel in a first wafer of said stack of wafers.

4. The micromechanical pressure relief valve arrangement according to claim 1, further comprising a filter connected between said active pressure relief valve, said passive pressure relief valve and said check valve.

5. The micromechanical pressure relief valve arrangement according to claim 4, wherein said filter is realized by an interface between two wafers in said stack of wafers.

6. The micromechanical pressure relief valve arrangement according to claim 5, wherein said filter is realized by an interface involving a wafer in which said active pressure relief valve and said passive pressure relief valve are arranged.

7. The micromechanical pressure relief valve arrangement according to claim 1, wherein said passive relief valve comprises a membrane composed by a mono-crystalline silicon device layer.

8. The micromechanical pressure relief valve arrangement according to claim 1, wherein said active relief valve comprises a resistive heat actuated valve.

9. The micromechanical pressure relief valve arrangement according to claim 1, wherein said check valve is realized by a biased valve body of one wafer supporting against a surface of a neighbouring wafer.

10. The micromechanical pressure relief valve arrangement according to claim 1, wherein said stack of wafers comprises at least three wafers.

11. The micromechanical pressure relief valve arrangement according to claim 10, wherein said stack of wafers comprises no more than three wafers.

* * * * *